United States Patent [19]

Conner

[11] Patent Number: 5,599,224

[45] Date of Patent: Feb. 4, 1997

[54] GROOVING APPARATUS FOR INJECTION MOLDING MACHINE BARREL

[75] Inventor: Randy L. Conner, Hayward, Wis.

[73] Assignee: Concor Tool & Machine, Inc., Hayward, Wis.

[21] Appl. No.: 428,721

[22] Filed: Apr. 25, 1995

[51] Int. Cl.[6] ........................................ B24B 7/19
[52] U.S. Cl. ........................ 451/236; 451/51; 451/280; 451/514; 409/143
[58] Field of Search ........................... 409/143, 144, 409/240; 451/51, 61, 76, 139, 174, 179, 236, 259, 280, 462, 514

[56] References Cited

U.S. PATENT DOCUMENTS

| | | | |
|---|---|---|---|
| H1,433 | 5/1995 | Estes et al. | 451/61 X |
| 1,997,978 | 4/1935 | Raule | 451/51 |
| 2,302,141 | 11/1942 | Perry . | |
| 2,551,061 | 5/1951 | Simpson et al. . | |
| 3,464,313 | 9/1969 | Shay et al. . | |
| 4,557,644 | 12/1985 | Scepanovic et al. . | |
| 4,887,585 | 12/1989 | Nutt | 451/51 X |
| 4,953,279 | 9/1990 | Colby | 451/51 X |
| 5,018,917 | 5/1991 | Colby . | |
| 5,175,964 | 1/1993 | Girndt | 451/61 |

FOREIGN PATENT DOCUMENTS

| | | | |
|---|---|---|---|
| 97554 | 7/1980 | Japan | 451/51 |
| 271667 | 11/1987 | Japan | 451/51 |
| 278607 | 8/1970 | U.S.S.R. | 451/51 |
| 2266255 | 10/1993 | United Kingdom | 451/51 |

*Primary Examiner*—Timothy V. Eley
*Attorney, Agent, or Firm*—Palmatier, Sjoquist & Helget

[57] ABSTRACT

This invention relates to an apparatus and method to modify molding machines for producing colored plastic parts using coloring liquid. The apparatus is inserted into and moved longitudinally along an injection molding machine barrel for forming a groove of varying shape and depth in the lower portion of the barrel.

28 Claims, 5 Drawing Sheets

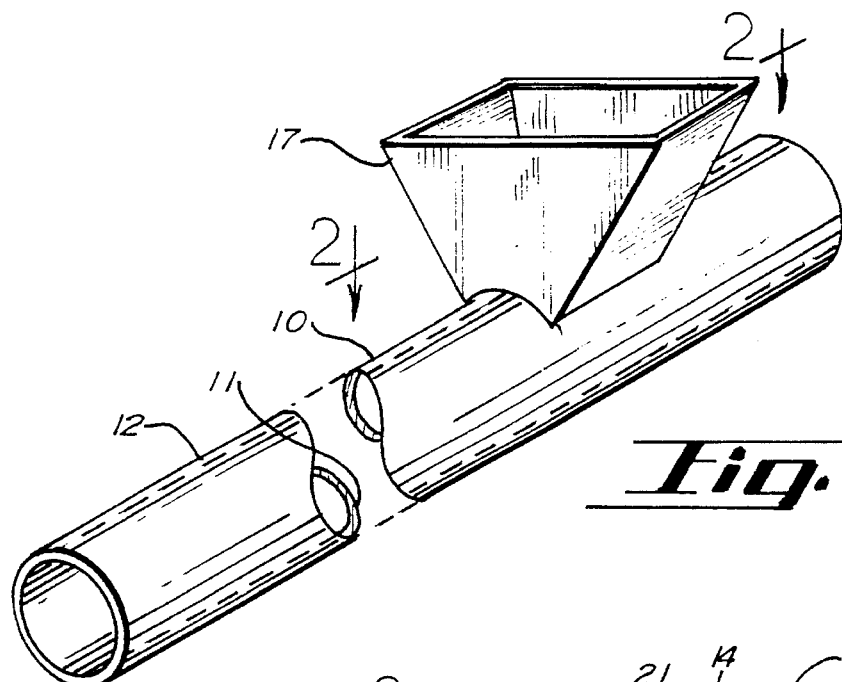
Fig. 1.
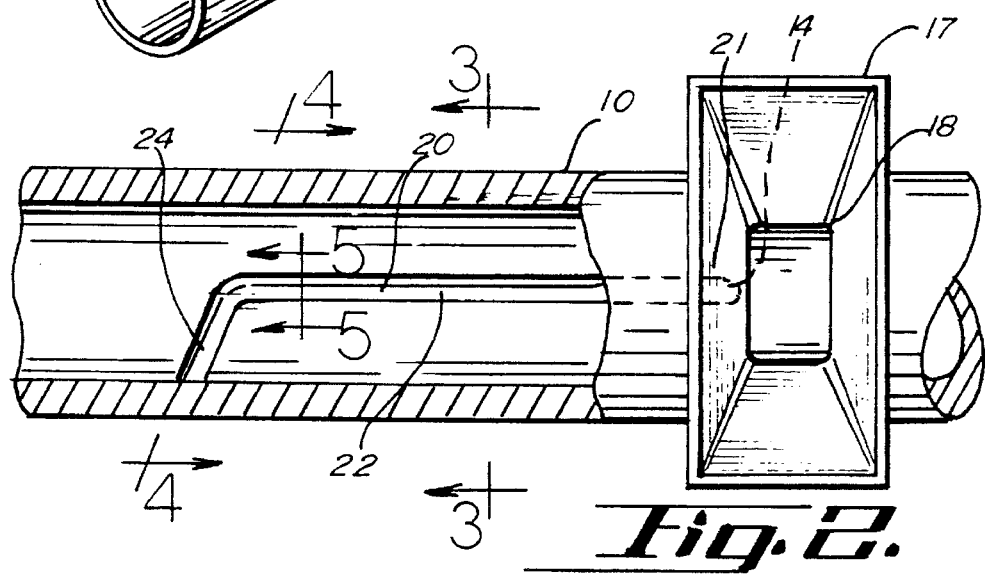
Fig. 2.
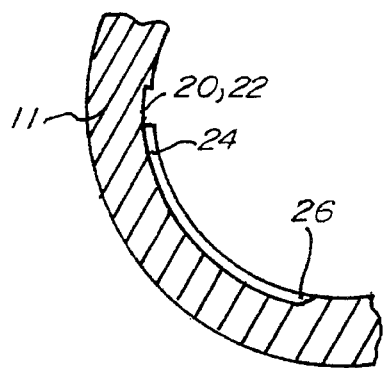 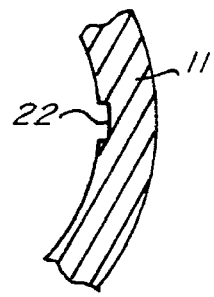 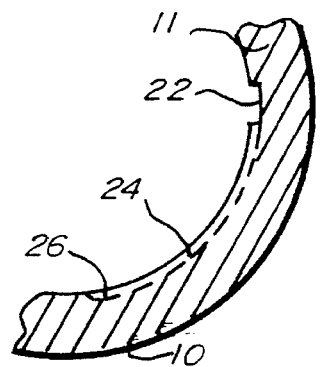
Fig. 4. Fig. 3. Fig. 5.

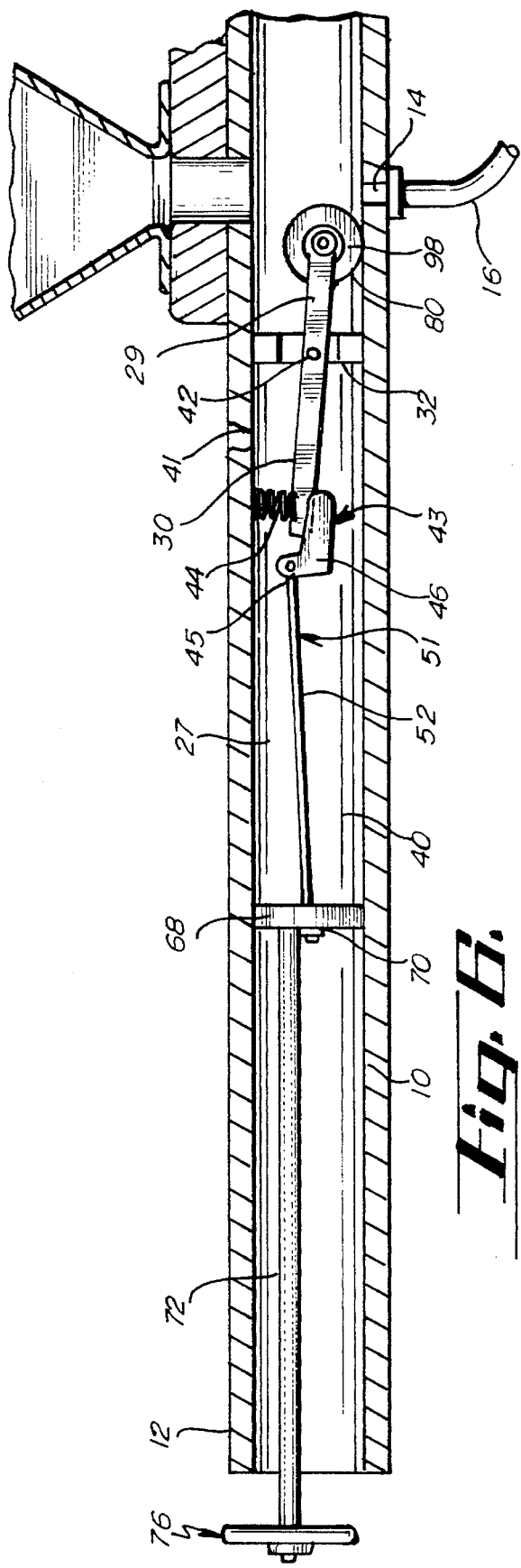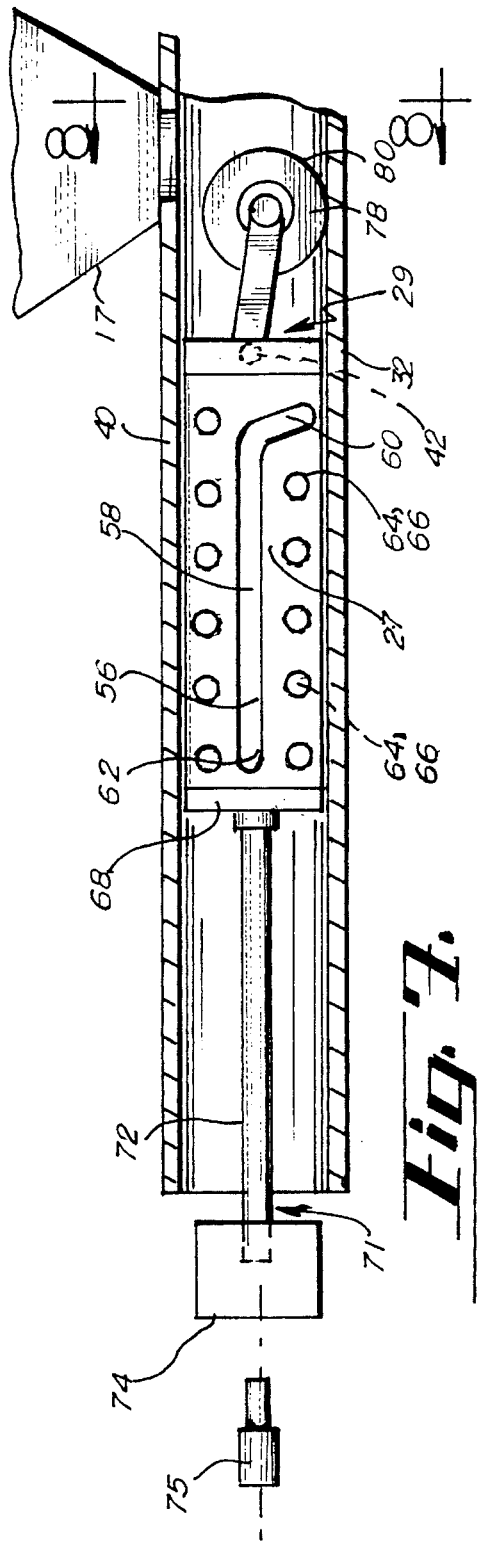

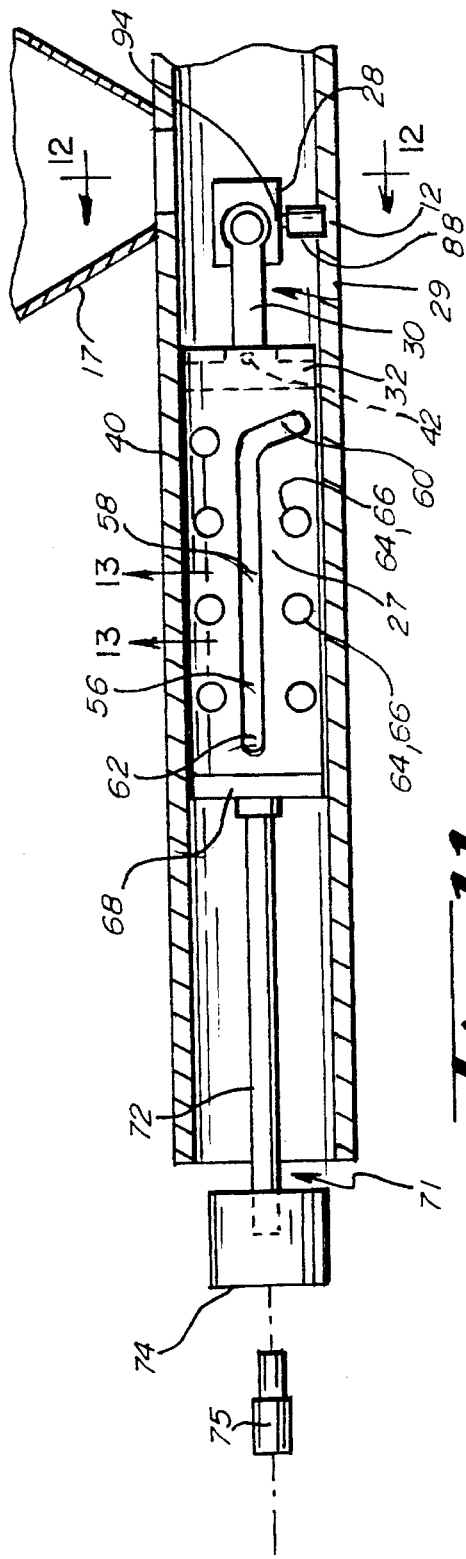
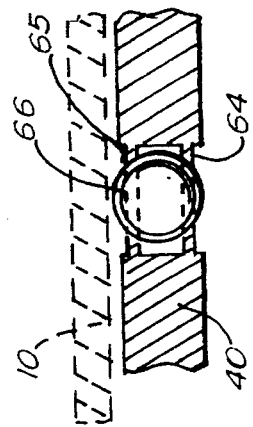
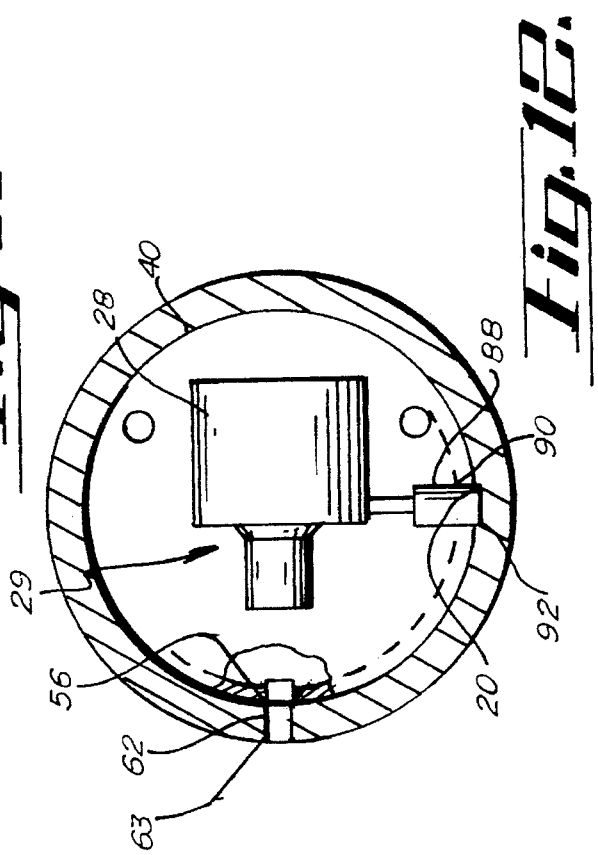

GROOVING APPARATUS FOR INJECTION MOLDING MACHINE BARREL

This invention relates to an apparatus to modify existing molding machines for producing colored plastic parts using a coloring liquid. The apparatus is inserted into and moved along the inside of an injection molding machine barrel to form a groove in the bottom or lower portion of the barrel. The groove is used to supply a coloring liquid into plastic material being transported in the barrel.

In the plastics industry, manufacturers form parts using injection molding machines. The injection molding machine generally consists of a hopper for supplying plastic pellets into the machine, a barrel with a rotating screw therein and a shape-providing cavity located on the hot end of the barrel. Plastics producers supply plastic pellets in a variety of colors as raw material. The machines transform the pellets into plastic parts.

In the injection molding machine, the most common method of transporting plastic pellets from the hopper to the cavity is with a rotating screw located inside the barrel. The screw transports, heats and applies pressure to the plastic material. The plastic pellets are mixed by the screw in the barrel to form a homogeneous mass. The melted plastic is injected into the cavity and held to form a plastic part.

Manufacturers produce different colored pans by several means. One means is to change the color of the plastic pellets. This method has several disadvantages which make color changes costly. Colored plastic pellets are typically colored by the plastic pellet supplier or at the plastic manufacturer's location. To change colors using colored plastic pellets, the operator must exhaust the current supply of plastic pellets and change the material in the hopper with an alternate supply of different color plastic pellets. Furthermore, the operator of the machine must clean the machine to remove colored plastic before switching to an new color. In addition, the process of changing color using colored pellets may take 5 minutes or more resulting in lost production. Adding to the cost, the parts manufacturer must maintain multiple inventories of plastic pellets, increasing inventory costs and reducing cash flow.

A liquid coloring has also been used to change the color of plastic. Previously the liquid coloring has been dropped into the hopper through which the plastic pellets are fed. Supplying the liquid coloring in this manner causes certain substantial problems. Firstly, the pellets become rather slippery and they won't feed correctly along the barrel to become molten and then injected into the molding machine. Secondly, the liquid coloring will contaminate the surfaces of the hopper and also will contaminate the inside surfaces of the barrel adjacent the hopper. As a result, these hopper surfaces and adjacent barrel surfaces must be thoroughly cleaned when the color of the liquid being used is changed.

In accordance with this invention, the interior surface of the injection molding machine barrel is modified to accept and blend the coloring liquid into the stream of plastic pellets being transported by the reciprocating screw. A shallow, liquidtransporting groove is formed in the lower portion of the barrel to accept coloring liquid from a hole in the bottom of the barrel and transport along the barrel. The liquid flows out of the groove near the hot end of the barrel and into the plastic where it can be mixed with the melted plastic and used to form homogeneously colored parts. This groove may be formed in existing injection molding machines, thus modifying them for the method of color change using a coloring liquid. By injecting the liquid coloring directly into the liquid transporting groove, the coloring liquid will run directly along the groove and will not be mixed with the plastic pellets until the liquid coloring emerges from the groove adjacent the hot end of the barrel. As a result, there is no liquid contamination of the hopper and barrel surfaces adjacent the hopper; the pellets are not made slippery and accordingly the pellets will feed correctly as desired; and the amount of coloring liquid is reduced by about 40 percent as compared to feeding the coloring in through the hopper.

SUMMARY OF THE INVENTION

An object of the invention is to produce an apparatus and method for forming a shallow groove in the bottom and lower portion of the barrel of an injection molding machine. This shallow groove is used to accept a coloring liquid from outside the barrel, aid in transporting the liquid along the barrel and disperse the coloring liquid into the plastic before being injected into the shape-providing cavity. The groove may vary in width, depth and shape.

A feature of the invention is a grooving device used to form a groove in the interior surface of the barrel. The grooving device comprises a rotary grooving tool and a motor.

Another feature of the invention is the use of a rigid elongated cylindrical slide to transport the grooving device inside the barrel and along the axis of the barrel to produce a groove generally longitudinally along the barrel.

Yet another feature of the invention is a means mounting the grooving device on the slide to cause the grooving tool to engage and groove the inner surface of the barrel. In this arrangement, the grooving device can be precisely controlled by the slide. This results in a precisely formed groove inside the barrel.

A further feature of the invention is a means moving the slide along the barrel. A force applying device is attached to the slide by a rod to move the slide along the axis of the barrel.

In a variation on the invention the force applying device comprises a handle for manual movement of the slide along the axis of the barrel.

In another variation on the invention, the moving rod is adapted to connect to an automatic moving means, such as a hydraulic cylinder to provide automatic movement of the slide along the axis of the barrel.

In yet another variation, the rotary grooving tool is a circular grinding wheel. The circular grinding wheel having a narrow edge portion to engage the inner surface of the barrel and form a groove. The circular grinding wheel rotates around the axis of the circular narrow edge. The circular narrow edge having a dimension equal to the desired width of the groove to be formed when the groove portion being formed is linear. When the grinding wheel is used to form non linear portions of a groove, the width of the circular narrow edge is smaller than the width of the resulting groove.

In another form, the rotary grooving tool comprises a barrel-shaped instrument having a cylindrical groove forming surface and a flat end groove forming surface. The barrel-shaped instrument is rotated around the axis of the cylindrical surface for engaging the inner surface of the barrel and forming a groove with the end surface and a portion of the cylindrical surface. The diameter of the cylindrical surface is substantially equal to the width of the groove.

In one embodiment, the slide is manufactured with a guide slot in the exterior surface of the slide. A guide pin is removably mounted in the wall of the barrel to allow the guide pin to extend into the barrel and into the guide slot. The slide is free to travel on a predetermined path in the barrel determined by the shape of the guide slot. The guide slot and guide pin control the precise linear and rotational movement of the slide in the barrel resulting in a predetermined shape of the groove to be formed by the grooving device.

In a variation, the guide slot has a portion which is linear and parallel to the axis of the slide. This variation provides a path for the grooving device to form a groove in the barrel with a portion which is linear and parallel to the axis of the barrel.

In another variation, the guide slot has a portion which is nonlinear and not parallel to the axis of the slide. This guide slot provides a path for the grooving device to form a groove in the barrel which has a portion which is not linear and not parallel to the axis of the barrel.

In yet another variation, a portion of the guide slot has a helical shape with respect to the axis of the slide. This variation provides a path for the grooving device to form a portion of the groove in the inner surface of the barrel in a helical shape with respect to the axis of the barrel resulting in a groove in the inner surface of the barrel which is helical in shape with respect to the axis of the barrel.

In a further variation, the guide slot in the surface of the slide has a portion which has a helical shape and an adjacent portion which has a linear shape. The slot provides a path for the grooving device to form a groove in the inner surface of the barrel which has adjacent portions which are linear and helical shaped.

In another embodiment of the invention, the motor of the grooving device is tiltably mounted on a tilt pin affixed to the tool mount. The grooving portion of the rotary grooving device extends away from the tilt pin and is positioned to engage the inner surface of the barrel. The slide has an operating means tilting the grooving device thereby moving the rotary grooving tool into and out of engagement with the inner surface of the barrel and controlling the depth of the groove. The tilt means comprises a pressure device effecting the tilt angle of the motor about the tilt pin to change the depth of the groove being formed. The pressure device opposes a spring and produces and controls the depth of the groove. The tilt may be changed as the slide travels along the axis of the barrel to form a groove which has a varying depth along its length.

In a variation of this embodiment, the slide has a mechanism to adjust the depth of the groove consisting of a pivotally mounted lever. One end of the pivotally mounted lever bears against the portion of the motor extending away from the tilt pin opposite the grooving tool. The other end of the pivotally mounted lever is connected to a tilt rod which has a portion which is threaded. The tilt rod extends from the lever to a cap in the slide where a nut bearing against the cap provides an adjustment of the length of the rod between the cap and the end of the lever. Rotation of the nut on the tilt rod causes a rotation of the lever about the pivot point and exerts a force on the motor to modify the tilt of the motor and thus the depth of the groove.

In another embodiment of the device, the slide has a multiplicity of ball bearings rotatably mounted in the outer surface of the slide. The ball bearings extend away from the surface of the slide to engage and roll along the inner surface of the barrel. The ball bearings allow the slide to move freely along the axis of the barrel. The ball bearings provide a means for the slide to maintain precise position within the barrel.

BRIEF DESCRIPTION OF THE DRAWINGS

FIG. 1 is a perspective view of the barrel portion of an injection molding machine showing the relationship between the hopper and the hot end of the barrel.

FIG. 2 is a detail top plan view of the barrel with a portion broken away at approximately at 2—2 of FIG. 1.

FIG. 3 is a detail section view taken at approximately 3—3 of FIG. 2.

FIG. 4 is a detail section view taken at approximately 4—4 of FIG. 2.

FIG. 5 is a detail section view taken at approximately 5—5 of FIG. 2.

FIG. 6 is a detail section view illustrating the grooving apparatus in the barrel particularly illustrating the slide with grooving tool attached, a portion of the slide being broken away to illustrate the tilt mechanism.

FIG. 7 is a detail section view of the barrel illustrating the grooving apparatus particularly illustrating the slide incorporating a first form of grooving tool and the guide slot.

FIG. 11 is a detail section view of the barrel showing the grooving apparatus particularly illustrating the slide incorporating a second form of grooving tool and the guide slot.

FIG. 12 is a section view taken at approximately 12—12 of FIG. 11 with portions of the slide broken away for illustrating the guide pin and slide groove.

FIG. 13 is a section view taken at approximately 13—13 of FIG. 11 illustrating the ball bearing mount in the slide.

DETAILED SPECIFICATION OF THE PREFERRED EMBODIMENT

Figure 8:
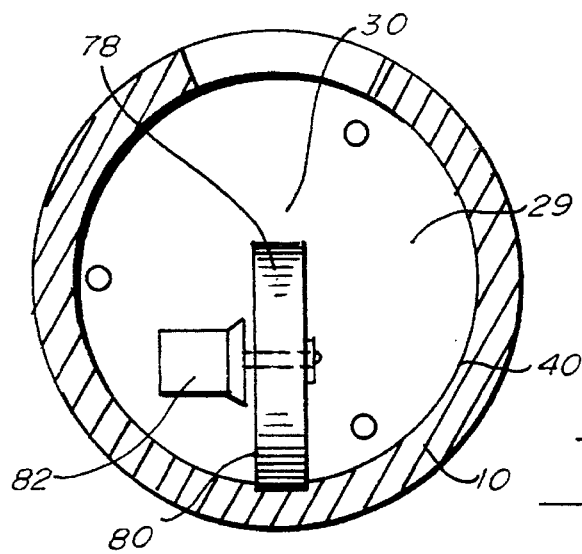
FIG. 8 is a section view taken approximately at 8—8 of FIG. 7.

Referring now to FIG. 1, the barrel 10 is illustrated showing the hopper 17 mounted on top of the barrel 10. The barrel 10 illustrated in FIG. 1 shows one example of an injection molding machine barrel 10 which is modified by the claimed invention.

FIGS. 2, 3, 4 and 5 illustrate the shape and location of one form of the groove 20 for coloring liquid in barrel 10. The hopper feed hole 18 is illustrated to show the relation to the coloring hole 14. The mounting relationship between the hopper feed hole 18 and the coloring hole 14 is typically measured in barrel diameter units. The coloring hole 14 is typically located no more than one barrel diameter from the edge of hopper feed hole 18 closest the hot end 12. In other configurations, the coloring hole 14 may be located closer to or farther away from the hopper feed hole 18. It should be understood, the coloring hole 14 should be located along the length of the groove 20 between the starting point 21 and the end ramp 26.

The groove 20 has a starting point 21 located at approximately the edge of the hopper feed hole 18. Starting point 21 may be located between the coloring hole 14 and the hopper feed hole 18 with the groove 20 extending toward the hot end 12 of the barrel 10.

A grooving apparatus indicated in general by the numeral 27 is inserted into the barrel 10 as illustrated in FIGS. 6, 7, and 11. Grooving apparatus 27 modifies the inner surface of barrel 10 by forming a groove 20. This groove 20 may have a shape which has a linear portion 22, a nonlinear portion or a helical portion 24 in any combination. The groove 20 has a length approximately 24 times its width. The groove 20 illustrated in FIG. 3, indicates the groove 20 formed in the inner surface of barrel 10 along lower portion 11. This groove 20 extends along the axis of barrel 10. The starting point 21 is located closer to the hopper 14 than end ramp 26. The groove 20 is formed to a predetermined depth.

The depth of the groove 20 may change between starting point 21 and end ramp 26 FIGS. 3–5 illustrate the tapering terminus of the groove 20 as it enters a helical pattern 24 along the inner surface of the barrel 10. The depth of the groove 20 diminishes along an end ramp 26 to become flush with the inner surface of the barrel 10 as illustrated in FIG. 4. The helical portion of the groove 24 traverses approximately 90 degrees around the axis of the barrel 10 from the linear portion 22 before terminating at the end ramp 26. FIGS. 4 and 5 illustrate the rotational travel around the axis of barrel 10 from the linear portion of the groove 22 to end ramp 26.

Principal components of the grooving apparatus 27 are a rigid elongate, cylindrically shaped slide 40 and a grooving device indicated in general by the numeral 29. Attached to slide 40 are a slide cap 68, a tool mount 32 and a means moving the slide 40. Grooving device 29 comprises a rotary grooving tool 28 and a motor 30. Rotary grooving tool 28 is powered by motor 30. The motor 30 is tiltably mounted to slide 40 by a means mounting indicated in general as tool mount 32. Motor 30 extends from tool mount 32 in two directions. Motor 30 extends into slide 40, to engage tilt lever 45. Motor 30 also extends out of slide 40 to engage rotary grooving tool 28. The rotary grooving tool 28 may alternatively utilize a grinding wheel 78 (see FIGS. 6–10) or a barrel-shaped instrument 88 (see FIGS. 11, 12, 14, 15). Other forms of grooving or cutting elements may also be substituted for barrel-shaped instrument 88 or wheel 78.

FIGS. 6–10 show the rotary grooving tool 28 comprising a circular grinding wheel 78. The cylindrical grinding wheel 78 has a narrow edge 80 and an axis of rotation 82. The circular grinding wheel 78 is mounted on the drive shaft 31 to rotate the circular grinding wheel 78 around axis of rotation 82. The axis 82 is positioned substantially parallel to a tangent of barrel 10 at the center point of groove 20. The narrow edge 80 of the circular grinding wheel 78 is used to engage the inner surface of the barrel 10 to form groove 20.

Figure 9:
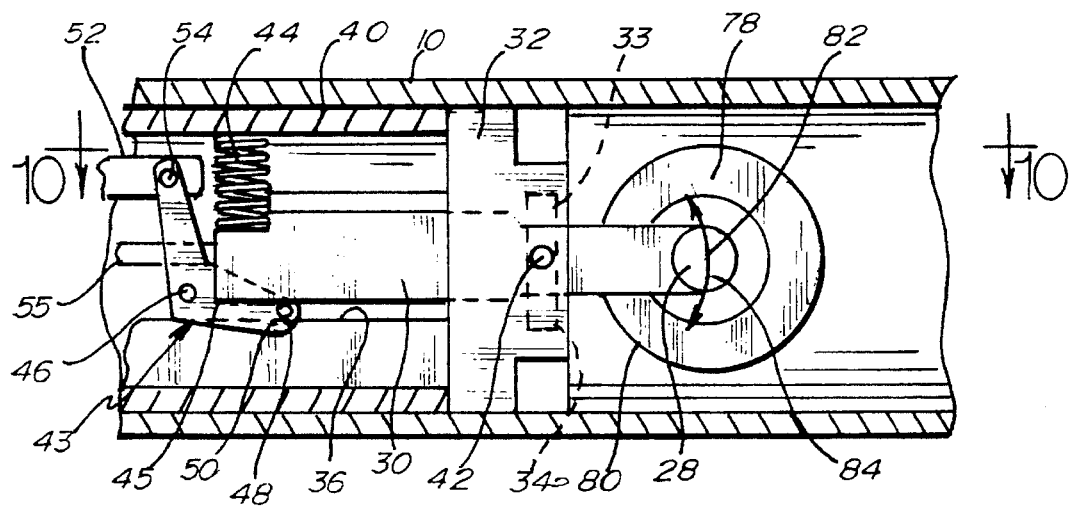
FIG. 9 is an enlarged detail view illustrating the tilting mechanism in use with the grinding wheel.
Figure 10:
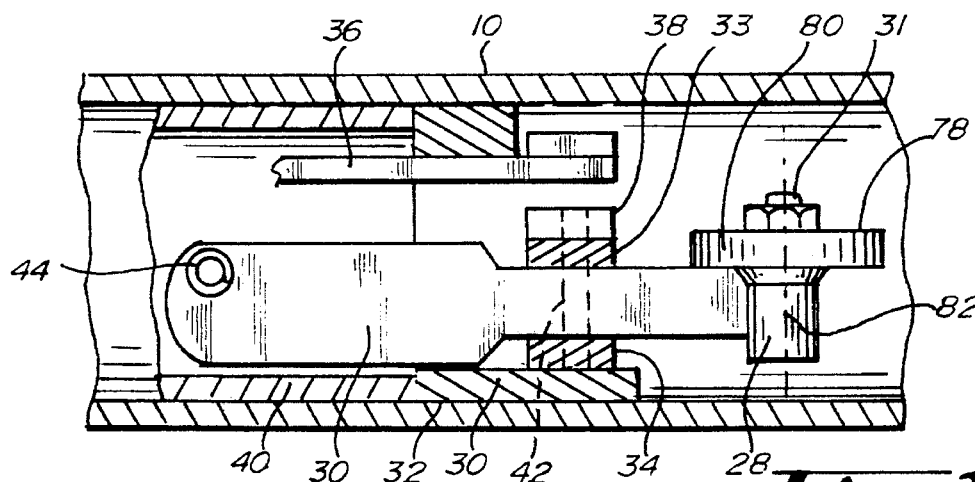
FIG. 10 is an enlarged detail section view taken approximately at 10—10 of FIG. 9.

With particular reference to FIG. 9, the narrow edge 80 of the circular grinding wheel 78 is used to engage the inner surface of the barrel 10 to form the groove 20. The circular grinding wheel 78 rotates around axis 82 to engage the inner surface of the barrel 10 with the narrow edge 80. The circular grinding wheel 78 moves into and out of contact with the inner surface of the barrel 10 along arrows 84 as the motor 30 tilts on tilt pin 42. This motion allows outer narrow edge 80 to contact the inner surface of the barrel 10 and form a groove 20. The tool mount 32 and slide 40 align groove-forming surfaces 90,92 with groove 20 formed by circular grinding wheel 78. This allows the grooving apparatus 27 to be removed from barrel 10 and change rotary grooving tool 28. A power connection 55 (See FIG. 9) extends along the slide 40 to power the motor 30. The power connection 55 may be used with air, hydraulic or electric powered motors 30. The rotary grooving device 28 is located off-center of the barrel 10 and the slide 40 so that the circular grinding wheel 78 is aligned substantially along a diameter of barrel 10. FIG. 6 illustrates the rotary grooving tool 28 used with the circular grinding wheel 78 and shows the narrow edge 80 of the circular grinding wheel 78 engaging the inner surface of the barrel 10.

The rotary grooving tool 28 alternately comprises a barrel-shaped instrument 88 to form groove 20. A barrel-shaped instrument 88 connected to the rotary grooving tool 28 by means of the drive shaft 31. Barrel-shaped instrument 88 comprises a cylindrical groove forming surface 90 and a flat, end groove forming surface 92. The groove-forming surfaces 90, 92 are typically diamond impregnated materials but may be an alternate suitable abrasive material. The barrel-shaped instrument 88 is rotated by motor 30 around an axis 94 of the cylindrical groove forming surface 90. Rotary grooving tool 28 is offset from a diameter of barrel 10 and connected to barrel-shaped instrument 88 with drive shaft 31. The diameter of cylindrical grinding surface 90 is equal to the width of groove 20. The diameter of barrel-shaped instrument 88 allows the cylindrical and end surfaces 90, 92 to fit into and continue forming a groove 20 formed by the cylindrical grinding wheel 78. The axis of rotation 94 is aligned with a diameter of barrel 10 to form the groove 20. Groove 20 is formed as barrel-shaped instrument 88 simulates a router by engaging the inner surface of the barrel 10 with the flat groove forming surface 92 and a portion of the cylindrical surface 90. The tilt mounting allows the rotary grooving tool 28 to move along a diameter of the barrel 10 to alternately engage and disengage the inner surface of the barrel 10. The tool mount 32 and slide 40 align groove-forming surfaces 90,92 with groove 20 formed by circular grinding wheel 78. This allows the grooving apparatus 27 to be removed from barrel 10 and change rotary grooving tool 28.

The motor 30 is mounted to tool mount 32 by means of clamping bars 33, 34. The tool mount 32 has a rigid frame portion 36 protruding along the motor 30 for the purposes of mounting the lever 45 and tilt pin 42. The clamping bars 33, 34 are used to mount the motor 30 to tilt pin 42. The motor 30 is clamped by the clamping bars 33, 34. The clamping bars 33, 34 and motor 30 are tiltably mounted on the tilt pin 42 to a frame 36 and to a rigid fixture 38 which is rigid with the frame 36. The clamping bars 33, 34 are clamped around the motor 30 to provide additional support. The motor 30 extends in two directions from the tilt pin 42. In one direction, the motor is adapted to the grooving device 29. In the other direction, the motor 30 is adapted to engage the spring 44 and pressure device 43.

A for means tilting the grooving device 29, to produce and control the tilt of motor 30 about tilt pin 42 comprises a pressure device indicated in general by the numeral 43 and a spring 44. The spring 44 bears against the inner surface of slide 40 and against motor 30 to urge motor to rotate counter-clockwise around tilt pin 42. the pressure device 43 bears against motor 30 and opposes spring 44 to urge motor 30 to rotate clockwise around tilt pin 42. Pressure device 43 and spring 44 produce and control tilt of motor 30 around tilt pin 42 causes the rotary grooving tool 28 to engage the inner surface of the barrel 10.

Figure 14:
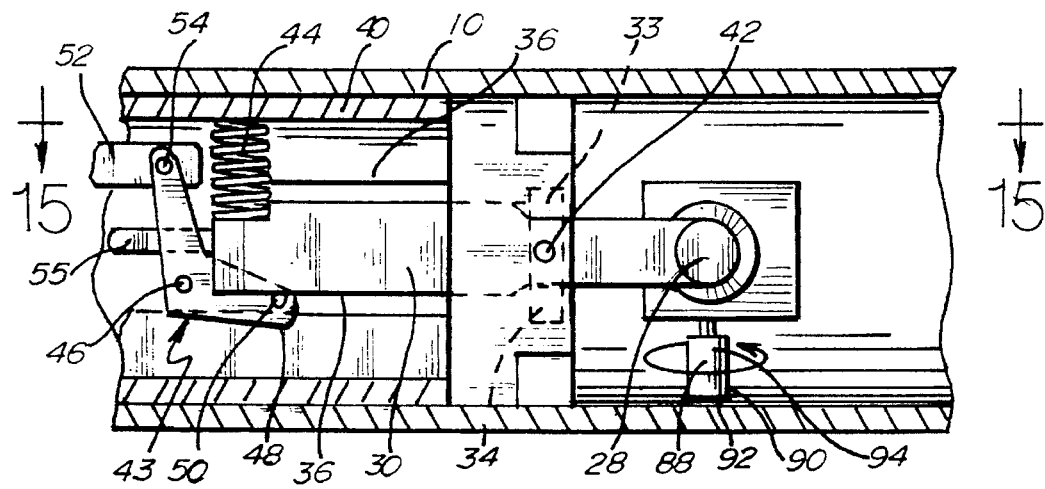
FIG. 14 is an enlarged detail section view illustrating the tilting mechanism in conjunction with the barrel-shaped grooving tool
Figure 15:
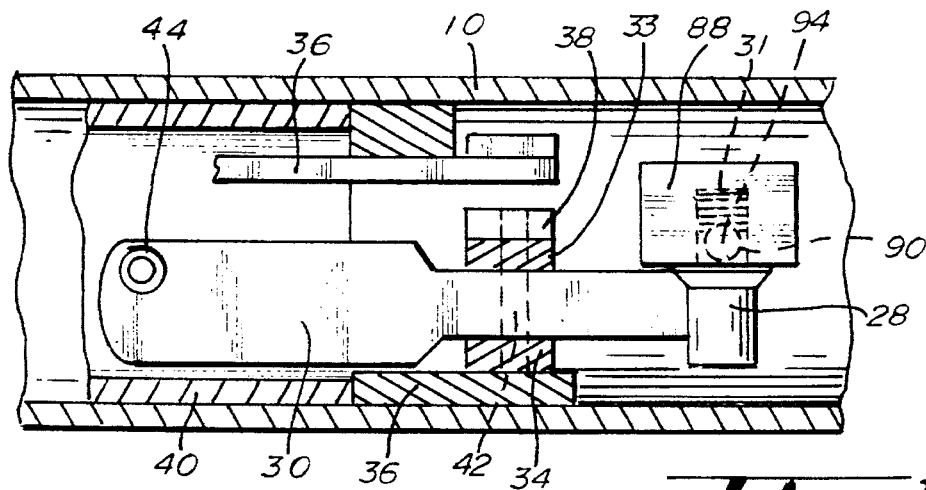
FIG. 15 is a detail section view taken at approximately 15—15 of FIG. 14.

FIGS. 9 and 14 illustrate a pressure device 43 comprising a lever 45 pivotally mounted on pivot pin 46. Pin 46 is affixed to a rigid bar 36 which is welded to the tool mount 32. This lever 45 has two ends extending obliquely of each other from the pivot pin 46. The lever 45 is connected to a tilt adjust means indicated in general by the numeral 51. The tilt adjust means 51 controlling and limiting rotation of lever 45 about pin 46. The tilt adjust means 51 comprising a tilt rod 52 connected to one end of lever 45 by pin 54. At the other end 48, the lever 45 bears against the motor 30, opposing the spring 44, and thereby producing and limiting the tilt of the motor 30. The lever 45 engages motor 30 with lift leg 48 and bears against motor 30 causing a clockwise tilting action of motor 30 about tilt pin 42. The rotation of the motor 30 around the tilt pin 42 causes the rotary grooving tool 28 to engage the inner surface of the barrel 10. The force of the lever 45, as it bears against the motor 30 is opposed by spring 44. Spring 44 bears against the motor 30 and the inner surface of the slide 40 thereby to urge the motor 30 to rotate counterclockwise about tilt pin 42. Spring 44 urges rotary grooving tool 28 out of engagement with the inner surface of the barrel 10.

The tilt rod 52 controls the rotational position of lever 45 about the pivot pin 46. The tilt rod 52 extends along the length of the slide 40 and through cap 68 as shown in FIG. 6. Tilt nut 70 is threadably mounted on tilt rod 52 and bears against the cap 68. Rotary adjustment of this tilt nut 70 forces the portion of the tilt rod 52 located between the cap 68 and the lever 45 to change. As tilt nut 70 is rotated on the threaded portion of the tilt rod 52 causing the tilt nut 70 to travel along the tilt rod 52 toward adjust pin 54, the tilt nut 70 bears against the cap 68 causing the length of the portion of the tilt rod 52 between the cap 68 and the adjust pin 54 to shorten. As the portion of the tilt rod 52 between the cap 68 shortens, lever 45 rotates counterclockwise around pivot point 46, applying pressure to the motor 30 opposing the spring 44. The motor 30 rotates clockwise about tilt pin 42 and the rotary grooving tool 28 is forced into engagement with the inner surface of the barrel 10. FIG. 9 illustrates the location of the spring 44 as it bears against the motor 30 with relation to the tilt pin 42 and the rotary grooving tool 28. The tilt rod 52, lever 45 and spring 44 are used to adjust the tilt of the motor 30 around tilt pin 42.

A guide slot 56 is formed in the outer surface of the slide 40. The guide slot 56 of FIGS. 7 and 11, has a portion which is linear 58 and parallel to the axis of the slide 40. An adjacent helical portion 60 of the guide slot is not parallel to the axis of the slide 40. The guide slot 56 is illustrated working with a guide pin 62 in barrel 10 as illustrated in FIGS. 7, 11, and 12. The guide slot 56 and guide pin 62 work together to control the rotation of the slide 40 as it travels inside the barrel 10.

As illustrated in FIG. 12, the guide pin 62 is removably mounted in barrel 10 by means of a hole 63. The guide pin 62 extends inwardly through the wall of the barrel 10 and protrudes into the guide slot 56 to control the orientation of the grooving apparatus 27 as the grooving apparatus 27 moves longitudinally along the axis of the barrel 10. Furthermore, the helical portion of the guide slot 60 working with the guide pin 62 causes the grooving apparatus 27 to rotate about the axis of the barrel 10 as the slide is moved along the barrel 10, causing a helical portion 24 of the groove 20, as illustrated in FIGS. 2–5. It should be recognized that guide pin 62 is stationary in hole 63 and may be threadably mounted to be removable. The hole 63 may be plugged when use of pin 62 is finished. When the slide 40, illustrated in FIGS. 7 and 11, is moved from right to left, the guide pin 62 guiding along the guide slot 56 prevents the grooving apparatus 27 from rotating until the slide 40 has moved to a point where the guide pin 62 enters the helical portion 60 of the guide slot 56. The helical portion 60 of the guide slot 56 causes the slide 40 to rotate slightly and preferably thorough about 90 degrees around the circumference of the barrel 10.

The means moving the slide comprises a force applying device indicated in general by the numeral 71. The force applying device 71 applies linear force to slide 40 to move slide 40 along the axis of barrel 10. The force applying device 71 comprises a transport rod 72 attached to a handle 76 or a coupling 74. The handle 76 is used for manual movement of grooving apparatus 27. Coupling 74 may be used for automatic movement of grooving apparatus 27. A hydraulic cylinder 75 or the like, may be attached to coupling 74 for automatic movement. The force applying device 71 transfers the linear force applied along the axis of the barrel 10 to effectuate movement of the slide 40.

FIGS. 7 and 11 show a multiplicity of mounting openings 64 located in the slide 40. Mounted in each mounting opening 64 is a ball bearing 66. A mounting device indicated in general by the numeral 65 holds the ball bearings 66 in position in mounting opening 64. These ball bearings 66 protrude slightly from the slide 40 to engage the inner surface of the barrel 10 as illustrated in FIG. 13. The mounting openings 64 are evenly spaced around the circumference of the slide 40 and along the length of the slide 40 to provide uniform contact with the inner surface of the barrel 10. These mounting openings 64 are positioned to maintain a precise relationship between the slide 40 and the barrel 10 while allowing the grooving apparatus 27 to freely move along and around the axis of the barrel 10.

The claimed invention is used to modify a barrel 10 by forming groove 20. Groove 20 is used to accept coloring liquid from supply line 16 and aid in mixing the coloring liquid with plastic pellets in barrel 10. Groove 20 is formed by grooving apparatus 27. Grooving apparatus comprises a slide 40 and grooving device 27. The slide 40 transports grooving device 27 along an axis of barrel 10 to form groove 20. In slide 40, motor 30 is tiltably mounted on tool mount 32 by tilt pin 42. Rotation of motor 30 about tilt pin 42 is controlled by pressure device 43 and spring 44. Pressure device 43 comprises a lever 45 pivotally mounted by tilt pin 42 to slide 40. Spring 44 bears against the inner surface of slide 40 and motor 30 to urge the motor to rotate counterclockwise about tilt pin 42. The lifting arm 48 of the L-shaped lever 45 bears against motor 30 opposing spring 44. The lifting arm 48 and spring 44 control and produce the rotation of motor 30 around tilt pin 42. The rotational tilt of motor 30 about pin 42 causes rotary grooving tool 28 to alternately engage and disengage with the inner wall of the barrel 10 thus controlling the depth of the groove 20. Rotational position of the lever 45 about pivot pin 46 is controlled by tilt rod 52 working with nut 70 which bears against cap 68. Tilt rod 52 is connected to lever 45 on one end and extends along the slide 40 away from tool mount 32. A portion of tilt rod 52 extends past cap 68. Nut 70 on tilt rod 52 controls rotation of lever 45 about pin 46 by bearing against cap 68.

Slide 40 is modified to have a guide slot 56 in the outer surface 41. Guide slot 56 is the same shape as the desired groove 20. Grooving apparatus 27 is inserted into barrel 10. Guide pin 62 is removably mounted in the barrel 10 in guide pin hole 63. Guide pin 62 is inserted through hole 63 and into guide slot 56 to control and limit the rotation of slide 40 in barrel 10.

Motion of grooving apparatus 27 along barrel 10 is caused by the force applying device 71. Force applying device 71 comprises a transport rod 72 on cap 68. A handle 76 or coupling 74 may be adapted to transport rod 72. Grooving apparatus 27 is moved longitudinally in the barrel 10 by linear force applied to the transport rod 72 along the axis of barrel 10. Guide pin 62 and the guide slot 56 control the rotation of the grooving apparatus 27 about the axis of the barrel 10. Working together, the force applying device 71, the guide pin 62 and slot 56 form groove 20 with the same shape as the guide slot 56.

While modifying barrel 10, the operator may remove grooving apparatus 27 and adapt rotary grooving tool 28 with different groove forming tools 78, 88. Furthermore, rotational position of motor 30 on tilt pin 42 is changed as the groove 20 is formed to form an end ramp 26 of the groove 20.

The width of the groove 20 is determined by the rotary grooving tool 28. When making linear portions of the groove 22, the width will be substantially equal to the width of the narrow edge of the circular grinding wheel 80 or the diameter of the barrel-shaped instrument 88. Using the circular grinding wheel 78 for forming helical portions of the groove 24 causes the groove width to be larger than the width of the narrow edge 80. The rotary grooving tool 28 is adapted to allow different groove forming tools such as the grinding wheel 78 and the barrel-shaped instrument 88 to align in the same groove 20.

Figure 16:
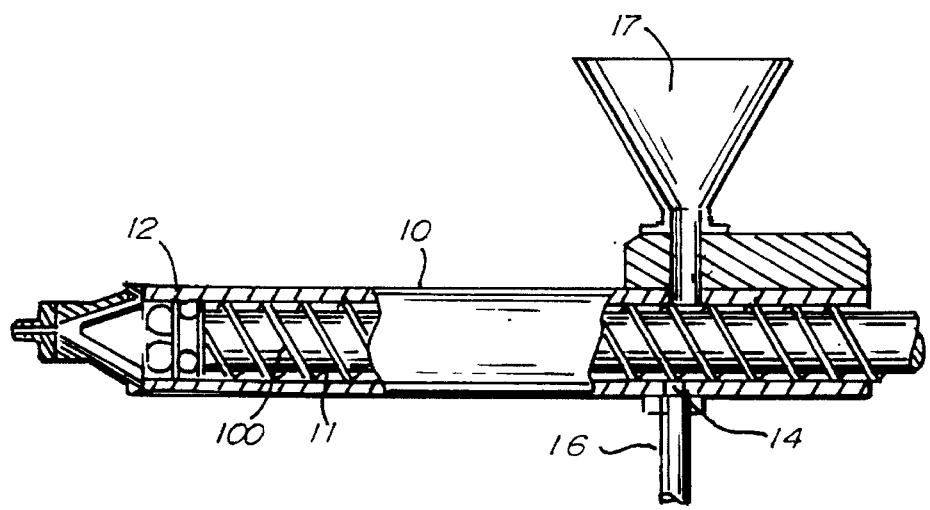
FIG. 16 is a perspective view of an injection molding machine barrel with the hopper, coloring tube and the reciprocating screw auger inserted into the barrel.

As is illustrated by FIG. 16, the rotating screw 100 is turned inside the barrel 10 to act as an auger to propel the plastic pellets from the hopper 17 to the hot end 12 of the barrel 10. The coloring liquid flows with the plastic pellets along groove 20 toward hot end 12 of barrel 10 resulting in colored plastic parts when the plastic is injected into a shape defining cavity.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. In combination with a rigid, tubular barrel of an injection molding machine, the barrel having an inside diameter and a cylindrical wall, the wall having inner and outer surfaces, the barrel to be modified by forming a shallow, liquid transporting groove along its inner cylindrical surface, a grooving apparatus for forming the groove comprising:

a. an elongated, cylindrically shaped slide, the slide slidably mounted inside the barrel the slide having an axis, the slide having an outer surface and an inner surface, the outer surface having a predetermined diameter less than the inside diameter of the barrel, the outer surface of the slide having an elongated guide slot extending generally longitudinally therealong, b. a grooving device comprising a rotary grooving tool and a motor connected to the rotary grooving tool, c. a means for mounting the grooving device on the slide to cause the grooving tool to engage and to groove the inner surface of the barrel, d. means for moving the slide along the inner surface of the barrel, and e. a guide pin removably fixed in the wall of the barrel, the guide pin protruding through the inner surface of the wall and into the guide slot thereby to limit and control the movement and rotation of the slide in the barrel and cause the liquid transporting groove being formed to have a shape similar to the guide slot.

2. The invention as set out in claim 1, wherein a portion of the guide slot has a linear shape to thereby form a portion of the groove in a linear shape.

3. The invention as set out in claim 1, wherein a portion of the guide slot has a nonlinear shape to thereby form a portion of the groove in a nonlinear shape.

4. The invention as set out in claim 1, wherein a portion of the guide slot has a helical shape to thereby form a portion of the groove in a helical shape.

5. The invention as set out in claim 1 wherein the guide slot has a linear portion having a linear shape and a helical portion having a helical shape to thereby form portions of the groove with similar linear and helical shapes.

6. The invention as set out in claim 1, wherein the means for moving the slide comprises a transport rod, the transport rod having a first and a second end, the first end connected to the slide, a force applying device attached to the second end of the transport rod to thereby apply linear force onto the slide and along the barrel axis to effectuate movement of the slide.

7. The invention as set out in claim 6, wherein the force applying device attached to the second end of the transport rod comprises a handle for manual movement of the slide.

8. The invention as set out in claim 6, wherein the device attached to the second end of the transport rod comprises a coupling for automatic movement of the slide.

9. The invention as set out in claim 8 wherein a hydraulic cylinder is attached to the transport rod to urge the slide to move in the barrel.

10. The invention as set out in claim 1, wherein the rotary grooving tool comprises a circular grinding wheel of abrasive material having an axis of rotation, the grinding wheel having an edge portion to engage the inner surface of the barrel and form a groove therein, the axis of rotation of the circular grinding wheel positioned substantially parallel to a tangent of the cylindrical wall positioned in the groove.

11. The invention as set out in claim 1, wherein the rotary grooving tool comprises a barrel-shaped instrument, the barrel-shaped instrument having a cylindrical groove forming surface and an end groove forming surface, the groove forming surfaces of the barrel-shaped instrument comprising abrasive material to thereby engage the inner surface of the barrel and form a groove therein, the cylindrical groove forming surface having an axis of rotation substantially perpendicular to a tangent of the cylinder wall positioned in the groove.

12. An apparatus for forming a shallow, liquid transporting groove in the inner surface of a barrel in combination with a barrel having an inner surface, the apparatus comprising:

a. an elongated cylindrically shaped slide movably mounted inside the barrel, the slide having a first end and a second end, the slide having an axis, the slide having an outer cylindrical surface, a tool mount on the slide, b. a grooving device on the tool mount, the grooving device comprising a rotary grooving tool and a motor connected to the rotary grooving tool, c. a means for moving the slide along the barrel connected to the slide, and d. a means for operating having a spring and a pressure device, the spring having a first end and a second end, the first end of the spring bearing against the inner cylindrical surface of the slide, the second end of the spring bearing against the grooving device to thereby urge the grooving device to tilt on the tool mount, the pressure device bearing against the grooving device, the pressure device opposing the spring, the pressure device having an adjustment means to thereby produce and limit the tilt of the grooving device on the tool mount.

13. The invention as set out in claim 12, wherein the pressure device comprises a pivot pin, and a lever, the pivot pin connected to the slide, the lever pivotally mounted on the pivot pin, the lever having a first end and a second end, the ends of the lever extending obliquely of each other from the pivot pin, a tilt adjust means connected to the first end of the lever, the second end of the lever bearing against the grooving device opposing the spring, thereby to produce and limit the tilt of the grooving device.

14. The invention as set out in claim 14, wherein the tilt adjust means comprises a tilt rod, the first end of the tilt rod connected to the first end of the lever, a portion of the second end of the tilt rod being threaded, a nut threadably attached to the threaded portion on the second end of the tilt rod, the nut adapted to resist movement of the tilt rod, the nut rotatably traversing the threaded portion of the tilt rod to urge the tilt rod to bear against and urge the lever to pivot about the pivot pin thereby to produce and limit the tilt of the grooving device.

15. A grooving apparatus in combination with a rigid, tubular barrel of an injection molding machine, the barrel having an inside diameter and a cylindrical wall, the wall having inner and outer surfaces, the barrel to be modified by forming a shallow liquid transporting groove in the inner surface, a grooving apparatus for forming the groove, the grooving apparatus comprising:
 a. an elongated cylindrically shaped slide movably mounted inside the barrel, the slide having a first end and a second end, the slide having an axis, the slide having an outer cylindrical surface, an inner cylindrical surface and a tool mount on the slide,
 b. a grooving device mounted on the tool mount, the grooving device comprising a rotary grooving tool and a motor connected to the rotary grooving tool,
 c. a means for moving the slide having a transport rod and a force applying device, the transport rod connected to the slide and the force applying device, and
 d. an operating means for bearing against the grooving device to move the rotary grooving tool into and out of engagement with the inner surface of the barrel and controlling the depth of the groove.

16. The invention as set out in claim 15, wherein the rotary grooving tool comprises a circular grinding wheel of abrasive material, the grinding wheel having an axis of rotation spaced from the groove and a narrow edge portion to engage the inner surface of the barrel and form a groove therein.

17. The invention as set out in claim 15, wherein the rotary grooving tool comprises a barrel-shaped instrument, the barrel-shaped instrument having an axis of rotation, a cylindrical groove forming surface and an end groove forming surface, the groove forming surfaces of the barrel-shaped instrument adapted to engage the inner surface of the barrel and form a groove therein, the axis of rotation extending into the groove.

18. The invention as set out in claim 15, wherein the force applying device attached to the second end of the transport rod comprises a handle for manual movement of the slide.

19. The invention as set out in claim 15, wherein the force applying device attached to the second end of the transport rod comprises a coupling for automatic movement of the slide.

20. A grooving apparatus for forming a shallow, liquid transporting groove in combination with a barrel having a wall having an inner surface, the inner surface having a fixed diameter, the grooving apparatus comprising:
 a. an elongated cylindrically shaped slide slidably mounted inside the barrel, the slide having a first end and a second end, the slide having an axis, the slide having an outer cylindrical surface, an inner cylindrical surface and a cap, the outer cylindrical surface having a guide slot and a multiplicity of mounting openings, the mounting openings being spaced from each other around the circumference of the slide, the mounting openings also spaced longitudinally along the length of the slide body, a multiplicity of ball bearings rotatably mounted in said mounting openings, the ball bearings mounted to protrude outward from the outer surface of the slide thereby to engage and roll along the inner surface of the barrel and control and limit the relationship between the outside surface of the slide and the inner surface of the barrel while the slide moves freely along the axis of the barrel,
 b. a grooving device having a rotary grooving tool and a motor connected to the rotary grooving tool,
 c. a means for mounting the grooving device on the slide to cause the grooving tool to engage and groove the inner surface of the barrel,
 d. means for moving the slide connected to the slide, and
 e. a guide pin removably mounted in the wall of the barrel, the guide pin protruding through the inner surface and extending into the guide slot to thereby limit and control the movement and rotation of the slide in the barrel.

21. In combination with a rigid, tubular barrel, the barrel having an inside diameter and a cylindrical wall, the cylindrical wall having an inner surface and an outer surface, the barrel to be modified by forming a groove along the inner cylindrical surface, the groove having a predetermined length, a varying depth and a shape, a grooving apparatus comprising:
 a. a slide movably mounted inside the barrel, the slide having an outer surface and an inner surface, a guide slot formed in the outer surface having a predetermined shape,
 b. a tool mount on the slide,
 c. a grooving device, the grooving device on the tool mount, the grooving device adapted to engage and disengage the inner surface of the barrel with the rotary grooving tool, and
 d. a rod attached to the slide for moving the slide axially along the barrel, and a guide pin in the cylindrical wall of the barrel, the guide pin protruding through the inner surface of the barrel and extending into the guide slot thereby to limit and control the movement and rotation of the slide in the barrel.

22. The invention as set out in claim 21, wherein a portion of the guide slot has a linear shape to thereby form a portion of the groove in a linear shape.

23. The invention as set out in claim 21, wherein a portion of the guide slot has a nonlinear shape to thereby form a portion of the groove in a nonlinear shape.

24. The invention as set out in claim 21, wherein a portion of the guide slot has a helical shape to thereby form a portion of the groove in a helical shape.

25. The invention as set out in claim 22 wherein the guide slot has a linear portion having a linear shape adjacent to a helical portion having a helical shape to thereby form portions of the groove with similar linear and helical shapes.

26. The invention as set out in claim 21, the grooving device comprising a rotary grooving tool having a circular grinding wheel of abrasive material having an axis of rotation, the grinding wheel having an edge portion to engage the inner surface of the barrel and form a groove therein the axis of rotation of the circular grinding wheel positioned substantially parallel to a tangent of the cylindrical wall positioned in the groove.

27. The invention as set out in claim 21, the grooving device comprising a rotary grooving tool having a barrel-shaped instrument, the barrel-shaped instrument having a cylindrical groove forming surface, the cylindrical groove forming surface of the barrel-shaped instrument adapted to engage the inner surface of the barrel and form a groove therein the cylindrical groove forming surface having an axis of rotation substantially perpendicular to a tangent of the cylinder wall positioned on the groove.

28. The invention as set out in claim 21 further comprising an outer cylindrical surface on the slide having a multiplicity of mounting openings, the mounting openings spaced from each other around a circumference of the outer cylindrical surface, the mounting openings also spaced longitudinally along the outer cylindrical surface, a multiplicity of ball bearings, each of the multiplicity of ball bearings rotatably retained in a mounting opening in the outer cylindrical surface, the ball bearings extending from the outer cylindrical surface of the slide to engage and roll along the inner surface of the barrel to support the movement of the slide in the barrel.

\* \* \* \* \*

UNITED STATES PATENT AND TRADEMARK OFFICE
CERTIFICATE OF CORRECTION

PATENT NO. : 5,599,224
DATED : February 4, 1997
INVENTOR(S) : Conner, Randy L.

It is certified that error appears in the above-indentified patent and that said Letters Patent is hereby corrected as shown below:

Column 1, after the title, insert --BACKGROUND OF THE INVENTION--.

Column 1, line 26, delete "pans" and substitute --parts--.

Column 6, line 59, delete "for".

Column 11, line 19, delete "14" (second occurrence) and substitute --13--.

Signed and Sealed this

Twenty-fifth Day of November, 1997

Attest:

BRUCE LEHMAN

*Attesting Officer*   *Commissioner of Patents and Trademarks*